Dec. 9, 1924.
T. A. FLOOD ET AL
MILL TRUCK
Filed March 13, 1922
1,518,497
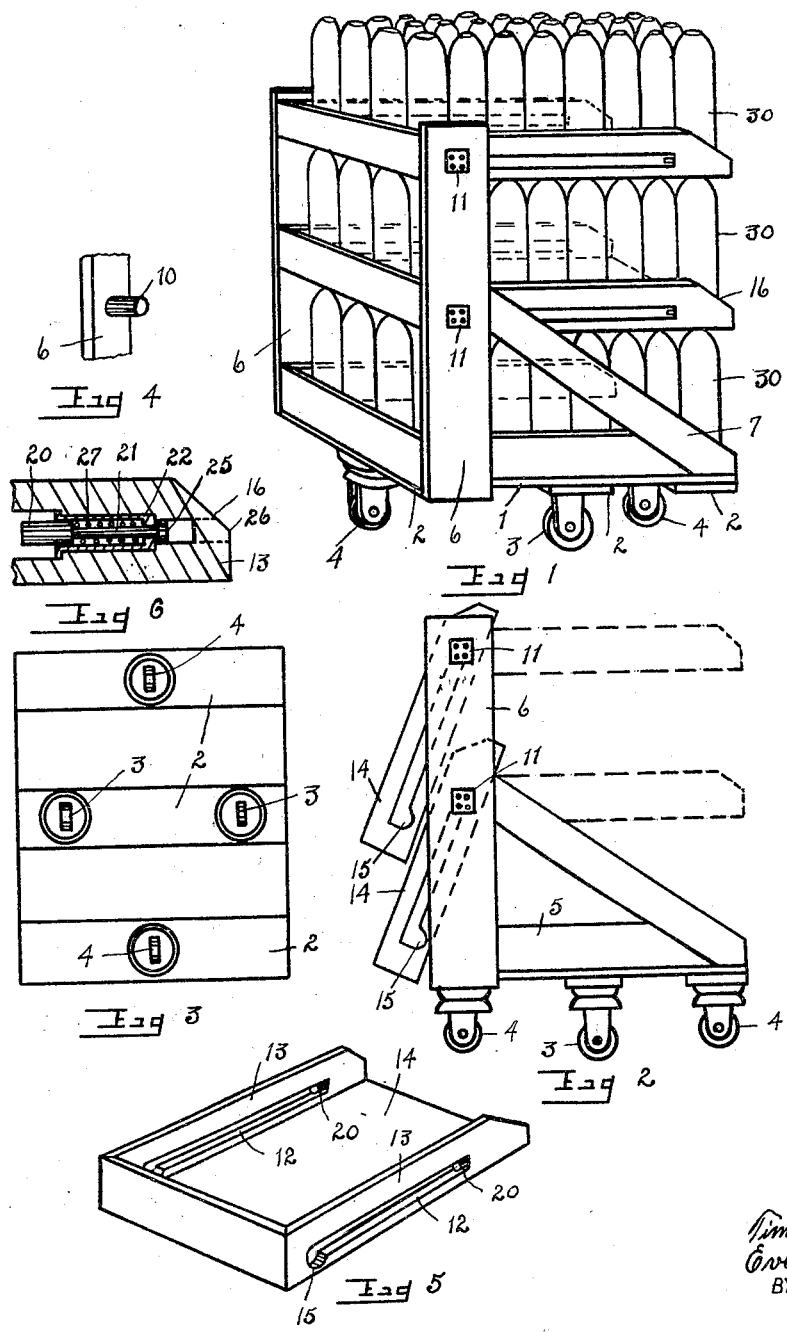
INVENTORS
Timothy A. Flood
Everett W. Conboy
BY
Thomas L. Wiles
ATTORNEY Patented Dec. 9, 1924.

1,518,497

UNITED STATES PATENT OFFICE.

TIMOTHY A. FLOOD AND EVERETT W. CONBOY, OF UTICA, NEW YORK.

MILL TRUCK.

Application filed March 13, 1922. Serial No. 543,267.

*To all whom it may concern:*

Be it known that we, TIMOTHY A. FLOOD and EVERETT W. CONBOY, citizens of United States, residing at Utica, in the county of Oneida and State of New York, have invented certain new and useful Improvements in Mill Trucks, of which the following is a specification, reference being had therein to the accompanying drawing.

Our invention relates to a mill truck and we declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide a truck adapted for use more particularly in transporting bobbins from one place to another in a knitting mill. Moreover, the truck is designed to facilitate the loading and unloading thereof with bobbins in a most convenient manner.

The object will appear by referring to the drawings, in which:

Fig. 1 is a perspective view of a mill truck, showing the same loaded with bobbins;

Fig. 2 is a side elevation of the truck;

Fig. 3 is a plan view of the truck looking at the same from the under side thereof;

Fig. 4 is an enlarged detail view, showing a stud supported in an upright, that is broken away, which stud is employed in the device;

Fig. 5 is a detail perspective view of a tray used;

Fig. 6 is an enlarged detail view showing a vertical section of a side wall of a tray employed, parts being broken away.

Referring more particularly to the drawings, the truck embodies a frame comprising a lower base or platform 1 having cleats 2, 2. 2 adapted for the attachment of roller bearing swiveled castors 3 and 4. Three of the four sides of the platform 1 are enclosed by side boards 5, 5, 5. Castors 3, 3 that are disposed in the center extend below the plane of the castors 4, 4, which are placed, one on each of the opposite ends of the truck. The truck will be run ordinarily on castors 3, 3. However, castors 4, 4 will be useful in holding the truck nearly in horizontal position when standing still.

Two forward uprights 6, 6 are attached permanently to the base member 1 and sides 5, 5 and are disposed on either side and conbraces 7, 7 disposed on either side and connected at opposite ends to side boards 5 and uprights 6 respectively.

Stud shafts 10, 10 project laterally through the uprights 6, 6 and are formed integral with plates 11, 11 that are counter sunk in the outer surface of uprights 6, 6. Each of the stud shafts 10 is adapted to engage an elongated recess 12, made in the side board 13 of each of the upper movable trays 14.

The elongated recesses 12 formed in the opposite sides of each of the upper trays 14 are enlarged at one end, as at 15, whereby to permit a small amount of vertical adjustment of said trays 14 to compensate for variations in height of bobbins disposed therebeneath.

In order to brake the fall of trays 14 when pushed into the full line position illustrated in Fig. 2, we have provided spring actuated plunger bolts 20 having reduced shafts 21. Said bolts 20 are disposed in sides 13, 13 of each of the trays 14, in such manner, as to project into the elongated recesses 12, 12, from the end thereof.

Bolts 20 are encased in metallic casings 22 that are mounted in the walls of sides 13. In order to secure the heads 25 to the outer free end of reduced shafts 21 the sides 13 are bored, as at 26 and then afterwards plugged. Spring 27 disposed about the reduced shaft 21 normally forces plunger bolt 20 outwardly.

Trays 14 are without a side wall at one end, whereby to faciliate the loading thereof. Furthermore, the free ends of said side walls are beveled at 16, 16, whereby to eliminate any sharp corners, that would be objectional.

In operation, the bobbins 30 are loaded on the first or lower platform 1 and, when that is filled, the next tray 14 thereabove is moved from full line position to dotted line position, as shown in Fig. 2. It will be supported at its free end by the top surfaces of bobbins 30, which have been disposed already on platform 1. This tray 14 will be filled thereupon, and, thus, the successive trays 14 will be loaded until the truck is completely filled.

Although we have shown only two trays 14 superimposed one above the other, obviously, trucks having any greater number of trays 14 may be constructed to suit the exigencies of the mill.

When unloading, the bobbins 30 will be taken off in the reverse order by beginning at the top tray 14. Immediately the top tray 14 is cleared of bobbins 30, the same will be pushed forward out of the way and into the dotted line position illustrated in Fig. 2.

Having thus described our invention what we claim as new and desire to secure by Letters Patent is:

1. In a mill truck, a frame, trays superimposed above said frame, and elongated recesses formed in said trays to permit the same to move relative to said frame.

2. In a mill truck having a frame, trays supported by said frame, elongated recesses in said trays and shafts projecting from said frame into said recesses, whereby to permit said trays to be moved into and out of loading position.

3. In a mill truck having a frame, trays supported by said frame, recesses in said trays and shafts adapted to project into said recesses, and means for braking the fall of said trays when the same are pushed out of the way.

In testimony whereof we have affixed our signatures.

TIMOTHY A. FLOOD.
EVERETT W. CONBOY.